United States Patent
Yonezawa (10) Patent No.: US 10,908,859 B1
(45) Date of Patent: Feb. 2, 2021

(54) IMAGE FORMING APPARATUS, PRINTING SYSTEM, AND PRINTING INFORMATION NOTIFICATION METHOD

(71) Applicant: TOSHIBA TEC KABUSHIKI KAISHA, Tokyo (JP)

(72) Inventor: Yushi Yonezawa, Atsugi Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/566,611

(22) Filed: Sep. 10, 2019

(51) Int. Cl.
*G06F 3/12* (2006.01)

(52) U.S. Cl.
CPC .......... *G06F 3/1259* (2013.01); *G06F 3/1229* (2013.01); *G06F 3/1285* (2013.01)

(58) Field of Classification Search
None
See application file for complete search history.

(56) References Cited

U.S. PATENT DOCUMENTS

| 8,174,716 | B2* | 5/2012 | Murata | G06F 3/1204 |
| | | | | 358/1.1 |
| 2009/0290190 | A1 | 11/2009 | Torii | |
| 2010/0188698 | A1* | 7/2010 | Koizumi | G06F 3/1213 |
| | | | | 358/1.15 |
| 2010/0214602 | A1* | 8/2010 | Moriwaki | G06F 3/1221 |
| | | | | 358/1.15 |
| 2016/0210094 | A1* | 7/2016 | Nishikawa | H04N 1/00411 |

* cited by examiner

*Primary Examiner* — Thomas D Lee
(74) *Attorney, Agent, or Firm* — Kim & Stewart LLP (57) ABSTRACT

An image forming apparatus includes a network interface and a processor configured to upon receipt of a print job from an external apparatus via the network interface, determine whether hold printing is instructed for executing the print job, when the hold printing is instructed, determine a state of the image forming apparatus, generate information about execution of the print job according to the determined state, and control the network interface to transmit the generated information to the external apparatus.

15 Claims, 7 Drawing Sheets

| USER ID | PRINT JOB | PRINTING METHOD |
|---------|-----------|-----------------|
| AAA | ○○○.docx | HOLD PRINTING |
| BBB | ×××.xlsx | REGULAR PRINTING |
| CCC | □□□.pptx | HOLD PRINTING |
| ⋮ | ⋮ | ⋮ |

IMAGE FORMING APPARATUS, PRINTING SYSTEM, AND PRINTING INFORMATION NOTIFICATION METHOD

FIELD

Embodiments described herein relate generally to an image forming apparatus, a printing system, and a printing information notification method.

BACKGROUND

An image forming apparatus of related art has a function of temporarily storing a print job issued from a client terminal in a queue of a server or the image forming apparatus, and holding it until the user operates the image forming apparatus to execute the job. This function is called "hold printing" or "demand printing". The hold printing is used for preventing another user from viewing or carrying out the document printed and discharged to a paper tray of the image forming apparatus.

Such a conventional image forming apparatus also has a function of entering a power saving mode when not receiving any printing job for a predetermined period of time. In the power saving mode, a temperature of a fixing unit for fixing a toner image on a sheet is set lower to reduce power consumption. Thus, it needs time for the image forming apparatus in the power saving mode to warm up the fixing unit and become ready for printing.

As such, if the user has instructed the terminal to perform the hold printing, he or she may not be able to collect the document immediately, because the image forming apparatus that the user chose is in the power saving mode. In this case, the user has to wait until warming-up of the image forming apparatus is completed.

DETAILED DESCRIPTION

In general, according to one embodiment, an image forming apparatus includes a network interface and a processor configured to upon receipt of a print job from an external apparatus via the network interface, determine whether hold printing is instructed for executing the print job, when the hold printing is instructed, determine a state of the image forming apparatus, generate information about execution of the print job according to the determined state, and control the network interface to transmit the generated information to the external apparatus.

Hereinafter, an image forming apparatus, a printing system, and a printing information notification method according to embodiments will be described with reference to the drawings.

First Embodiment

Figure 1:
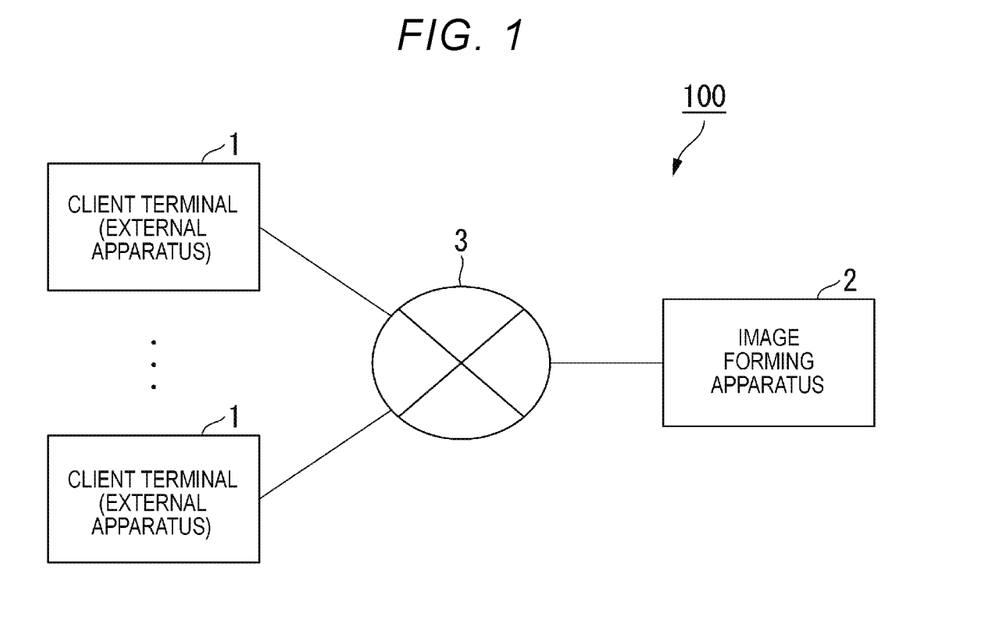
FIG. 1 is a diagram showing a configuration of a printing system according to a first embodiment.

FIG. 1 is a diagram showing a configuration of a printing system 100 according to a first embodiment.

The printing system 100 includes a plurality of client terminals 1 and an image forming apparatus 2. The printing system 100 may include one client terminal 1 or may include two or more image forming apparatuses 2. The client terminal 1 and the image forming apparatus 2 are communicably connected to each other via a network 3. The network 3 may be a network configured in any manner. For example, the network 3 is a network, such as a wireless local area network (LAN) or a wired LAN.

The client terminal 1 is an information processing apparatus, such as a smart phone, a mobile phone, a tablet terminal, a notebook personal computer (PC), a PC, or the like. The client terminal 1 instructs the image forming apparatus 2 to execute printing. In particular, the client terminal 1 instructs the image forming apparatus 2 to execute printing via various printing methods, according to an operation of a user. The printing methods include, for example, regular printing and hold printing. The printing methods are not limited thereto.

The regular printing is a printing method in which the image forming apparatus 2 starts printing as soon as receiving a printing instruction from the client terminal 1. In the regular printing, the printing operation is started when there is no print job stored in the image forming apparatus 2.

The hold printing is a printing method in which a print job is temporarily held in a queue of the image forming apparatus 2, and printing is executed when the user operates the image forming apparatus 2. In the hold printing, a printing operation is not started unless the user inputs a printing instruction on the image forming apparatus 2. As such, in the hold printing, the printing operation is not started unless the user operates the image forming apparatus 2 and inputs the printing instruction to the image forming apparatus 2.

When the image forming apparatus 2 is instructed to execute the hold printing, the client terminal 1 receives information about execution of the hold printing (hereinafter, referred to as "executability information") from the image forming apparatus 2. Then, the client terminal 1 displays the received executability information on a screen. The executability information indicates whether printing is possible based on an operation state of the image forming apparatus 2. For example, the executability information indicates that (i) printing is executable, (ii) a power saving mode is in progress, or (iii) another job is being processed. Also, the executability information may indicate that (iv) printing is executable but the printer may transition to the power saving mode within a certain time.

As described above, when the image forming apparatus 2 is instructed to execute the hold printing, the client terminal 1 displays information indicating whether printing is immediately possible.

The image forming apparatus 2 is a multi-function printer capable of forming a toner image on a sheet. The sheet is, for example, a piece of paper on which a character and/or an image is printed. The sheet is not limited as long as the image forming apparatus 2 is able to read the sheet. In addition, the image forming apparatus 2 can read an image printed on a sheet and generate image information.

Upon receiving a hold printing execution instruction from the client terminal 1, the image forming apparatus 2 transmits the executability information according to its own operation state to the client terminal 1. The image forming apparatus 2 according to the first embodiment transmits, to the client terminal 1, the executability information according to the operation state when the hold printing execution instruction is received from the client terminal 1.

Next, specific configurations of the client terminal 1 and the image forming apparatus 2 will be described.

Figure 2:
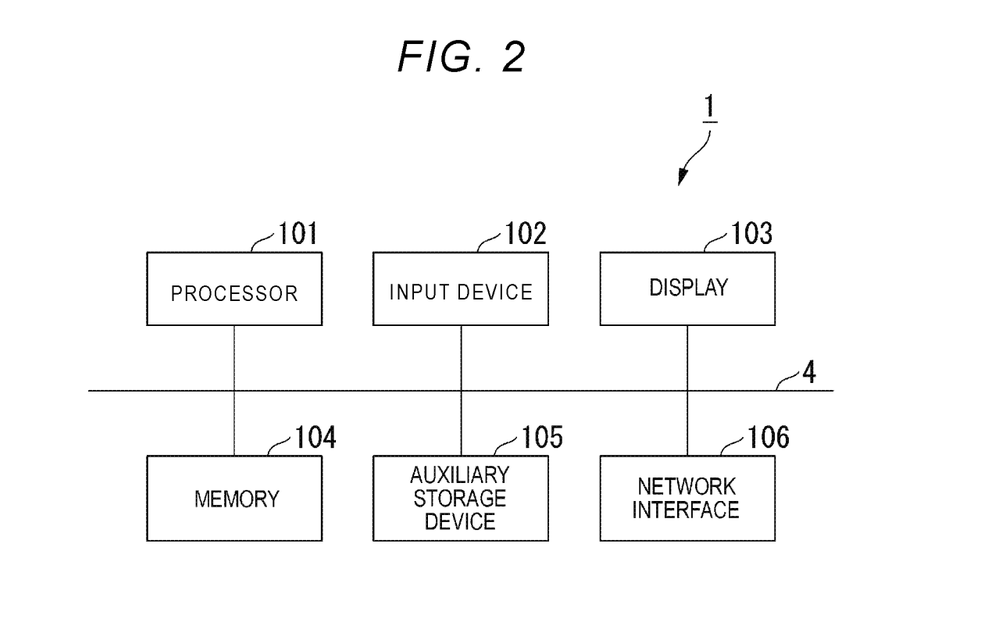
FIG. 2 is a block diagram showing a hardware configuration of a client terminal according to the first embodiment.

FIG. 2 is a block diagram showing a hardware configuration of the client terminal 1 according to the first embodiment.

The client terminal 1 includes a processor 101, an input device 102, a display 103, a memory 104, an auxiliary storage device 105, and a network interface 106. Also, each component included in the client terminal 1 is connected via a system bus 4 for data communication.

The processor 101 controls operations of each component of the client terminal 1. The processor 101 executes various processes by executing a program stored in a read only memory (ROM) (not shown). Also, the processor 101 controls the display 103 to display the executability information received from the image forming apparatus 2 via a printer driver.

The input device 102 is an input device, such as a keyboard, a pointing device (a mouse, a tablet, or the like), a touch panel, a button, or the like. The input device 102 receives an operation of the user. The input device 102 outputs a signal according to the operation performed by the user to the processor 101. The input device 102 and the display 103 may be configured as an integrated touch-enabled display.

The display 103 is an image display device, such as a liquid crystal display, an organic electro luminescence (EL) display, a cathode ray tube (CRT) display, or the like. The display 103 displays the executability information.

Figure 3:
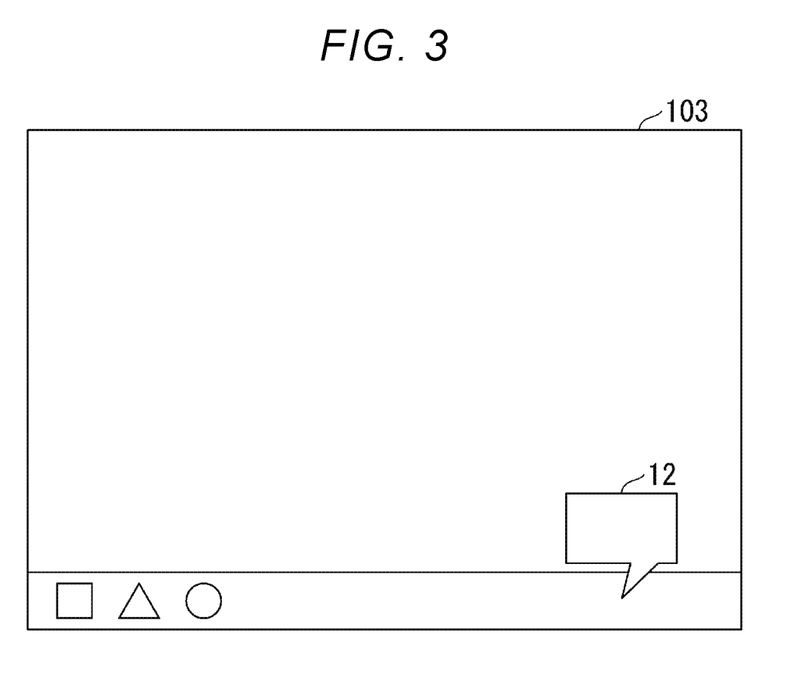
FIG. 3 is a diagram showing executability information displayed on a display according to the first embodiment.

FIG. 3 is a diagram showing an example of the executability information displayed on the display 103.

As shown in FIG. 3, executability information 12 is displayed on a screen of the display 103, in a popup manner. The user is notified of whether printing is immediately executable, via such information.

The description will continue by referring back to FIG. 2.

The memory 104 temporarily stores data used by each component included in the client terminal 1. The memory 104 is, for example, a random access memory (RAM). The memory 104 may temporarily store the executability information.

The auxiliary storage device 105 is, for example, a hard disk or a solid state drive (SSD), and stores various types of data. The various types of data are, for example, a program of the printer driver.

The network interface 106 transmits or receives data to or from another apparatus, e.g., the image forming apparatus 2. The network interface 106 operates as an input interface to receive information or an instruction transmitted from the other apparatus. Also, the network interface 106 operates as an output interface to transmit a printing execution instruction to the other apparatus.

Figure 4:
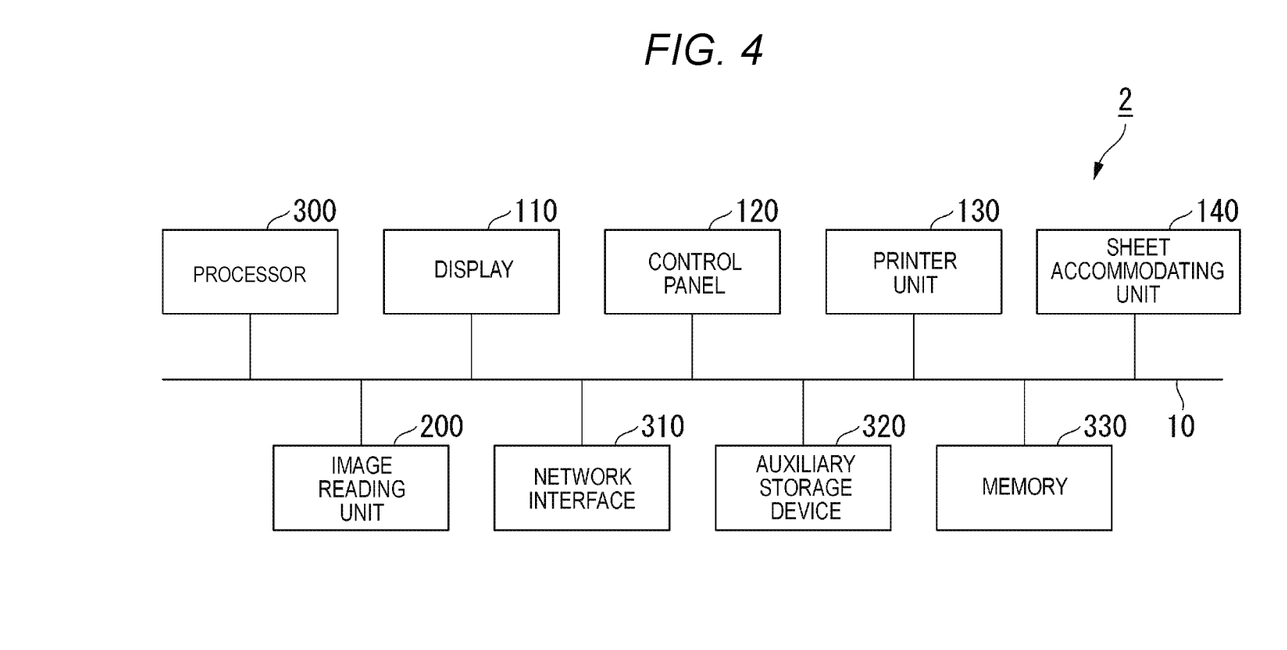
FIG. 4 is a block diagram showing a hardware configuration of an image forming apparatus according to the first embodiment.

FIG. 4 is a block diagram showing a hardware configuration of the image forming apparatus 2 according to the first embodiment.

The image forming apparatus 2 includes a display 110, a control panel 120, a printer unit 130, a sheet accommodating unit 140, an image reading unit 200, a network interface 310, an auxiliary storage device 320, a memory 330, and a processor 300. Each component included in the image forming apparatus 2 is connected via a system bus 10 for data communication.

The display 110 is an image display device, such as a liquid crystal display, an organic EL display, or the like. The display 110 displays various types of information about the image forming apparatus 2.

The control panel 120 includes a plurality of buttons. The control panel 120 receives an operation of the user. The control panel 120 outputs a signal according to an operation performed by the user to the processor 300. Also, the display 110 and the control panel 120 may be configured as an integrated touch-enabled panel.

The printer unit 130 executes an image forming process and an image fixing process. The image forming process is a process of forming an image on a sheet. The image fixing process is a process of fixing the image formed on the sheet. In the image forming process, the printer unit 130 forms the image on the sheet based on image information generated by the image reading unit 200 or image information received through the network interface 310. In the image fixing process, the printer unit 130 fixes the image on the sheet by heating the sheet where the image is formed via a heat roller included in a fixing unit. In the following description, the image forming process and the image fixing process are collectively referred to as printing.

The sheet accommodating unit 140 accommodates a sheet on which an image is formed by the printer unit 130.

The image reading unit 200 reads an image printed on a sheet by recognizing light and shade. For example, the image reading unit 200 reads the image printed on the sheet set on a document reading table. The image reading unit 200 records the read image as image information. The recorded image information may be transmitted to another information processing apparatus through a network. The recorded image information may be printed on a sheet by the printer unit 130.

The network interface 310 transmits or receives data to or from another apparatus. Here, the other apparatus in the image forming apparatus 2 is the client terminal 1. The network interface 310 operates as an input interface to receive data or an instruction transmitted from the other apparatus. The instruction transmitted from the other apparatus is a printing execution instruction. The network interface 310 operates as an output interface to transmit the executability information to the other apparatus.

The auxiliary storage device 320 is, for example, a hard disk or SSD, and stores various types of data. The various types of data are, for example, digital data, a job, a job log, and a print job table. The print job table is a table where a print job is registered. Alternatively, these data may be stored in the memory 330 so that the processor 300 can access them quickly.

Figure 5:
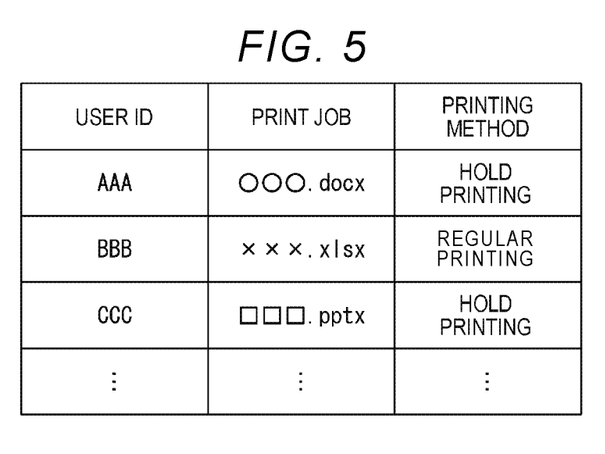
FIG. 5 is a diagram showing a print job table according to the first embodiment.

FIG. 5 is a diagram showing a print job table according to the first embodiment.

The print job table includes a plurality of records related to registered print jobs. Each record has a user ID, a print job, and a printing method. The user ID indicates a transmission source of the print job. The user ID may be any information as long as the user, i.e., the transmission source of the print job, is identifiable. For example, the user ID is a MAC address of the client terminal 1. The print job indicates a job in which a printing instruction is issued from the client terminal 1 to the image forming apparatus 2. For example, the print job is indicated by the file name of a document to be printed, e.g., "coo.docx" and "xxx.xlsx". The printing method indicates a printing method of print data indicated by the print job, e.g., "hold printing" and "regular printing".

In the example shown in FIG. 5, a plurality of print jobs is registered in the print job table. For example, in the print job table, the print jobs from the three client terminals 1 identified by user IDs "AAA", "BBB", and "CCC" are registered. Among the print jobs registered in the print job table, the printing methods of the print jobs of the client terminals 1 identified by the user IDs "AAA" and "CCC" are hold printing. Also, among the print jobs registered in the print job table, the printing method of the print job of the client terminal 1 identified by the user ID "BBB" is regular printing.

In the example of FIG. 5, the image forming apparatus 2 transmits the executability information to the client terminals 1 identified by the user IDs "AAA" and "CCC". On the other hand, the image forming apparatus 2 does not transmit the executability information to the client terminal 1 identified by the user ID "BBB", because the designated printing method is not the hold printing.

The description will continue by referring back to FIG. 4.

The memory 330 temporarily stores data used by each component included in the image forming apparatus 2. The memory 330 is, for example, a RAM. The memory 330 may store digital data generated by the image reading unit 200. The memory 330 may temporarily store any one of the job, the job log, and the print job table.

The processor 300 controls operations of each component of the image forming apparatus 2. The processor 300 performs various processes by executing a program stored in ROM (not shown). Here, various processes performed by the processor 300 according to the first embodiment will be described. When a job received from the client terminal 1 is a hold print job, the processor 300 transmits to the client terminal 1 the executability information according to the operational state of the image forming apparatus 2.

When a transition notification condition to the power saving mode is satisfied, the processor 300 switches the mode of the image forming apparatus 2 to the power saving mode. The transition notification condition to the power saving mode is a condition for notifying the target client terminal 1 of a time until transition to the power saving mode. Here, the target client terminal 1 is the client terminal 1 that instructed the hold printing.

The processor 300 determines that the transition notification condition is satisfied when a remaining time until the transition to the power saving mode (hereinafter, referred to as a "transition remaining time") at a predetermined point of time is smaller than a threshold value. On the other hand, the processor 300 determines that the transition notification condition is not satisfied when the transition remaining time is equal to or greater than the threshold value. The predetermined point of time may be the timing when the state of the image forming apparatus 2 is determined or when the hold print job is received.

Figure 6:
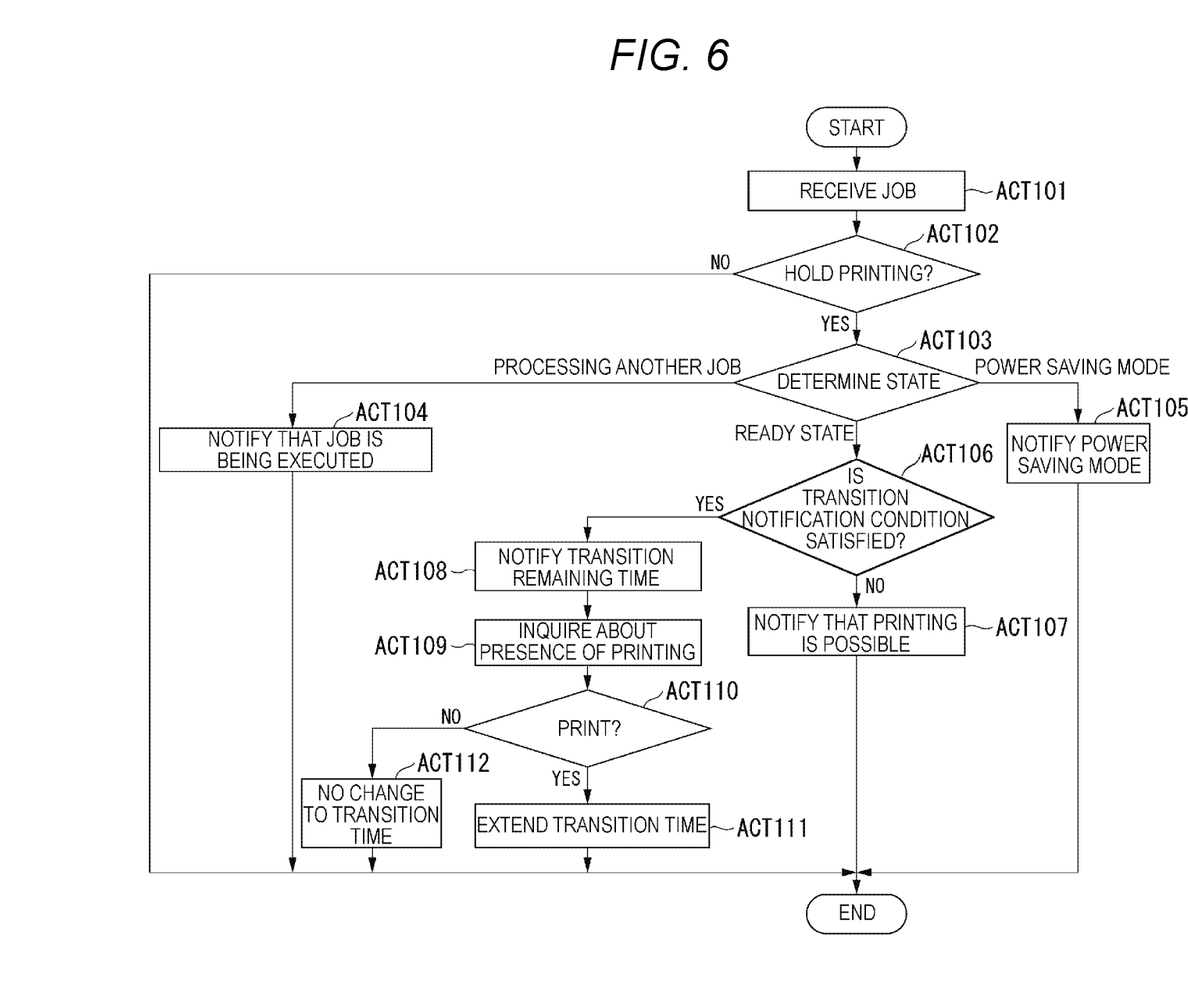
FIG. 6 is a flowchart showing a flow of notification processes performed by the image forming apparatus according to the first embodiment.

FIG. 6 is a flowchart showing a flow of notification processes performed by the image forming apparatus 2 according to the first embodiment.

The network interface 310 receives a job (for example, a print job) transmitted from the client terminal 1 (ACT101).

Upon receipt of the job from the network interface 310, the processor 300 registers the job to the print job table. Then, the processor 300 determines whether the printing method indicated by the job is hold printing (ACT102). In other words, the processor 300 determines whether the job is a hold print job.

When the printing method is not the hold printing (ACT102: NO), the image forming apparatus 2 ends the processes of FIG. 6. Here, the printing method is not the hold printing in a case of, for example, regular printing. When the printing method is the regular printing, the processor 300 controls the printer unit 130 to print data included in the job. When the printing is done, the processor 300 deletes the job from the print job table.

When the printing method is the hold printing (ACT102: YES), the processor 300 determines the state of the image forming apparatus 2 (ACT103). For example, the processor 300 determines whether the image forming apparatus 2 is processing another job or whether the image forming apparatus 2 is in the power saving mode or in a ready state. The ready state indicates a state in which a temperature of the fixing unit is maintained at a fixing temperature and printing can be performed immediately. When the image forming apparatus 2 is processing another job (ACT103: processing another job), the processor 300 generates the executability information indicating that the other job is being processed. Then, the processor 300 specifies the client terminal 1 as a transmission source of the job by referring to the print job table. Next, the processor 300 controls the network interface 310 to transmit the generated executability information to the client terminal 1 as the transmission source of the job (ACT104). Then, the image forming apparatus 2 ends the process of FIG. 6.

In the process of ACT103, when the image forming apparatus 2 is in the power saving mode (ACT103: power saving mode), the processor 300 generates the executability information indicating that the power saving mode is in progress. Then, the processor 300 specifies the client terminal 1 as the transmission source of the job by referring to the print job table. Next, the processor 300 controls the network interface 310 to transmit the generated executability information to the client terminal 1 as the transmission source of the job (ACT105). Then, the image forming apparatus 2 ends the process of FIG. 6.

Further, in the process of ACT103, when the image forming apparatus 2 is in the ready state (ACT103: ready state), the processor 300 determines whether the transition notification condition is satisfied (ACT106). When the transition notification condition is not satisfied (ACT106: NO), the processor 300 generates the executability information indicating that printing is executable. Then, the processor 300 specifies the client terminal 1 as the transmission source of the job by referring to the print job table. Next, the processor 300 controls the network interface 310 to transmit the generated executability information to the client terminal 1 as the transmission source of the job (ACT107). Then, the image forming apparatus 2 ends the process of FIG. 6.

In the process of ACT106, when the transition notification condition is satisfied (ACT106: YES), the processor 300 notifies the client terminal 1 of the transition remaining time (ACT108). In detail, first, the processor 300 calculates an elapsed time from a predetermined point of time to a current point of time. Then, the processor 300 calculates the remaining time to the power saving mode by subtracting the calculated elapsed time from a predetermined transition time. Here, the transition time is a time until the image forming apparatus 2 transitions to the power saving mode. In other words, the image forming apparatus 2 transitions to the power saving mode when no process has been performed for the transition time. Then, the processor 300 generates the executability information indicating printing is executable but the image forming apparatus 2 may transition to the power saving time within the calculated remaining time. Next, the processor 300 specifies the client terminal 1 as the transmission source of the job by referring to the print job table. Then, the processor 300 controls the network interface 310 to transmit the generated executability information to the client terminal 1 as the transmission source of the job. Accordingly, the client terminal 1 is notified that printing can be performed for the remaining time.

The processor 300 issues a confirmation notification for confirming whether to perform the printing immediately. Then, the processor 300 specifies the client terminal 1 as the transmission source of the job by referring to the print job table. Next, the processor 300 controls the network interface 310 to transmit the generated confirmation notification to the client terminal 1 as the transmission source of the job. Through this process, the image forming apparatus 2 inquires the client terminal 1 about whether to perform the printing immediately (ACT109).

Figure 7:
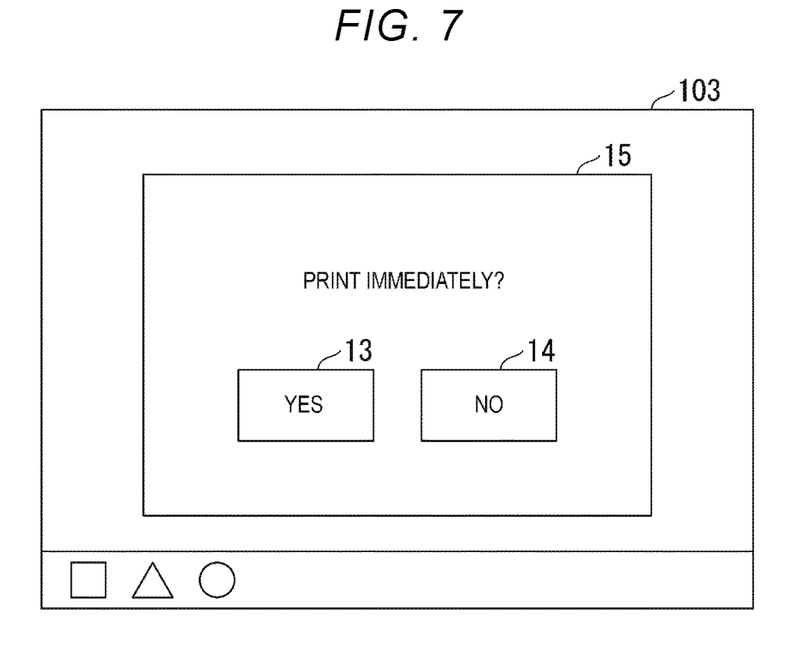
FIG. 7 is a diagram showing a confirmation screen displayed on the client terminal according to the first embodiment.

FIG. 7 is a diagram showing the confirmation notification displayed on the display 103 of the client terminal 1.

As shown in FIG. 7, a popup screen 15 inquiring whether to perform printing immediately is displayed on the display 103 with select buttons 13 and 14. The select button 13 is a button selected when the printing is performed immediately. The select button 14 is a button selected when the printing is not performed immediately. The user of the client terminal 1 operates the input device 102 to select one of the select buttons 13 and 14 from the popup screen 15. When one of the select buttons 13 and 14 is selected, a response to the confirmation notification is transmitted from the client terminal 1 to the image forming apparatus 2.

Thereafter, upon receiving the response to the confirmation notification from the client terminal 1, the processor 300 confirms the content of the response to the confirmation notification. The processor 300 determines whether the response to the confirmation notification indicates that the printing is performed immediately (ACT110). When the information indicating that the printing is performed immediately (ACT110: YES), the processor 300 extends the time until transition to the power saving mode. In detail, the processor 300 extends the time until transition to the power saving mode by adding a predetermined time to the transition remaining time.

On the other hand, when the information indicating that the printing is not performed immediately (ACT110: NO), the processor 300 does not change the time until transition to the power saving mode (ACT112).

According to the image forming apparatus 2 of the first embodiment, security by hold printing can be maintained while reducing user's standby time. In detail, upon receiving the print job of hold printing, the image forming apparatus 2 transmits the executability information according to the state of the image forming apparatus 2 to the client terminal 1 that transmitted the print job. Then, the client terminal 1 displays the executability information transmitted from the image forming apparatus 2 on the screen. Accordingly, the user is able to immediately identify whether printing is executable. Thus, the user is able to execute the printing on the image forming apparatus 2 at timing when the printing is executable. Since the user approaches the image forming apparatus 2 at the timing when the printing is executable, a time until printing is shortened even when the user instructs the printing after arriving at the image forming apparatus 2. Since the printing is performed after the user arrives at the image forming apparatus 2, security is maintained. Thus, it is possible to maintain the security while reducing the standby time of the user.

Further, the image forming apparatus 2 extends the time until transition to the power saving mode when the user desires immediate printing even when the time until transition to the power saving mode is short. Accordingly, there is no immediate transition to the power saving mode. Thus, the temperature of the fixing unit included in the printer unit 130 is maintained to the fixing temperature. Accordingly, the image forming apparatus 2 is able to execute the printing immediately after the printing execution instruction is issued. Consequently, it is possible to reduce the user's standby time.

Second Embodiment

In the first embodiment, the executability information according to the operation state of the image forming apparatus 2 when the hold printing execution instruction is received from the client terminal 1 is transmitted to the client terminal 1. In a second embodiment, the image forming apparatus 2 transmits the executability information to the client terminal 1 at timing when the printing is executable after the hold printing execution instruction is received.

In the second embodiment, the configuration of the printing system 100 and the components included in the client terminal 1 and the image forming apparatus 2 are the same as those of the first embodiment. Differences from the first embodiment are the processes performed by the processor 300 of the image forming apparatus 2. Hereinafter, only the differences will be described.

The processor 300 according to the second embodiment generates the executability information at the timing when the printing is executable. In other words, the processor 300 according to the second embodiment does not generate the executability information when the image forming apparatus 2 is in the power saving mode or processing another job.

Figure 8:
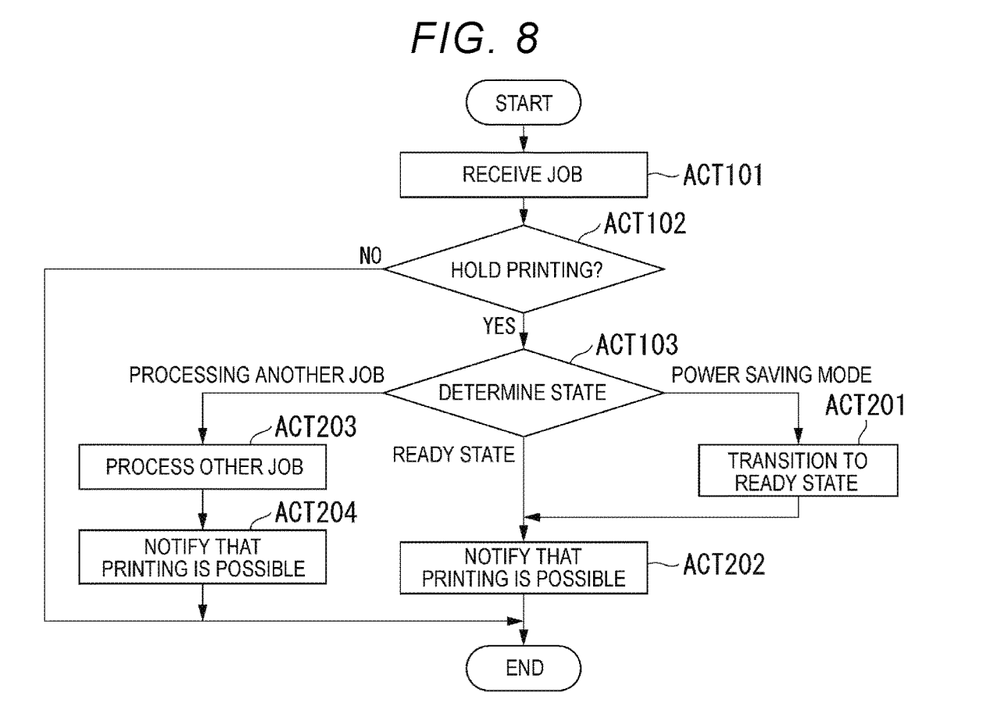
FIG. 8 is a flowchart showing a flow of notification processes performed by an image forming apparatus according to a second embodiment.

FIG. 8 is a flowchart showing a flow of notification processes performed by the image forming apparatus 2 according to the second embodiment. In FIG. 8, processes identical to those of FIG. 6 are denoted by same reference numerals and details thereof are omitted.

In the process of ACT103, when the image forming apparatus 2 is in the power saving mode (ACT103: power saving mode), the processor 300 switches the mode of the image forming apparatus 2 from the power saving mode to the ready mode (ACT201). In detail, the processor 300 increases the temperature of the fixing unit included in the printer unit 130 by supplying power to the printer unit 130. Accordingly, the temperature of the fixing unit included in the printer unit 130 is changed from a power saving temperature to the fixing temperature. As a result, the image forming apparatus 2 is ready for printing.

Then, the processor 300 generates the executability information indicating that printing is executable. Then, the processor 300 specifies the client terminal 1 as the transmission source of the job by referring to the print job table. Then, the processor 300 controls the network interface 310 to transmit the generated executability information to the client terminal 1 as the transmission source of the job (ACT202). Then, the image forming apparatus 2 ends the process of FIG. 8.

In the process of ACT103, when the image forming apparatus 2 is processing another job (ACT103: processing another job), the processor 300 processes the other job (ACT203). Then, the processor 300 generates the executability information indicating that printing is executable. Then, the processor 300 specifies the client terminal 1 as the transmission source of the job by referring to the print job table. Then, the processor 300 controls the network interface 310 to transmit the generated executability information to the client terminal 1 as the transmission source of the job (ACT204). Then, the image forming apparatus 2 ends the process of FIG. 8.

The image forming apparatus 2 according to the second embodiment transmits the executability information to the client terminal 1 at the timing when the printing is executable. Accordingly, the user is able to identify the timing when the printing is executable. Thus, the user is able to execute the printing on the image forming apparatus 2 at the timing when the printing is executable. Since the user approaches the image forming apparatus 2 at the timing when the printing is executable, a time until printing is shortened even when the user instructs the printing after arriving at the image forming apparatus 2. Also, since the printing is performed after the user arrives at the image forming apparatus 2, security is maintained. Thus, it is possible to maintain the security while reducing the standby time of the user.

Third Embodiment

A third embodiment is an embodiment in which the first embodiment and the second embodiment are combined. In detail, in the third embodiment, the executability information is transmitted to the client terminal 1 at the timing of transmitting the executability information in each of the first embodiment and the second embodiment.

In the third embodiment, the configuration of the printing system 100 and the components included in the client terminal 1 and the image forming apparatus 2 are the same as those of the first embodiment or the second embodiment. Differences from the first embodiment and the second embodiment are processes performed by the processor 300 of the image forming apparatus 2. Hereinafter, only the differences will be described.

The processor 300 according to the third embodiment generates the executability information according to the operation state of the image forming apparatus 2 when the hold printing execution instruction is received from the client terminal 1. The processor 300 generates the executability information at the timing when the printing is executable. In other words, the processor 300 according to the third embodiment generates the executability information even when the printing is executable, the image forming apparatus 2 is in the power saving mode, or another job is processed.

Figure 9:
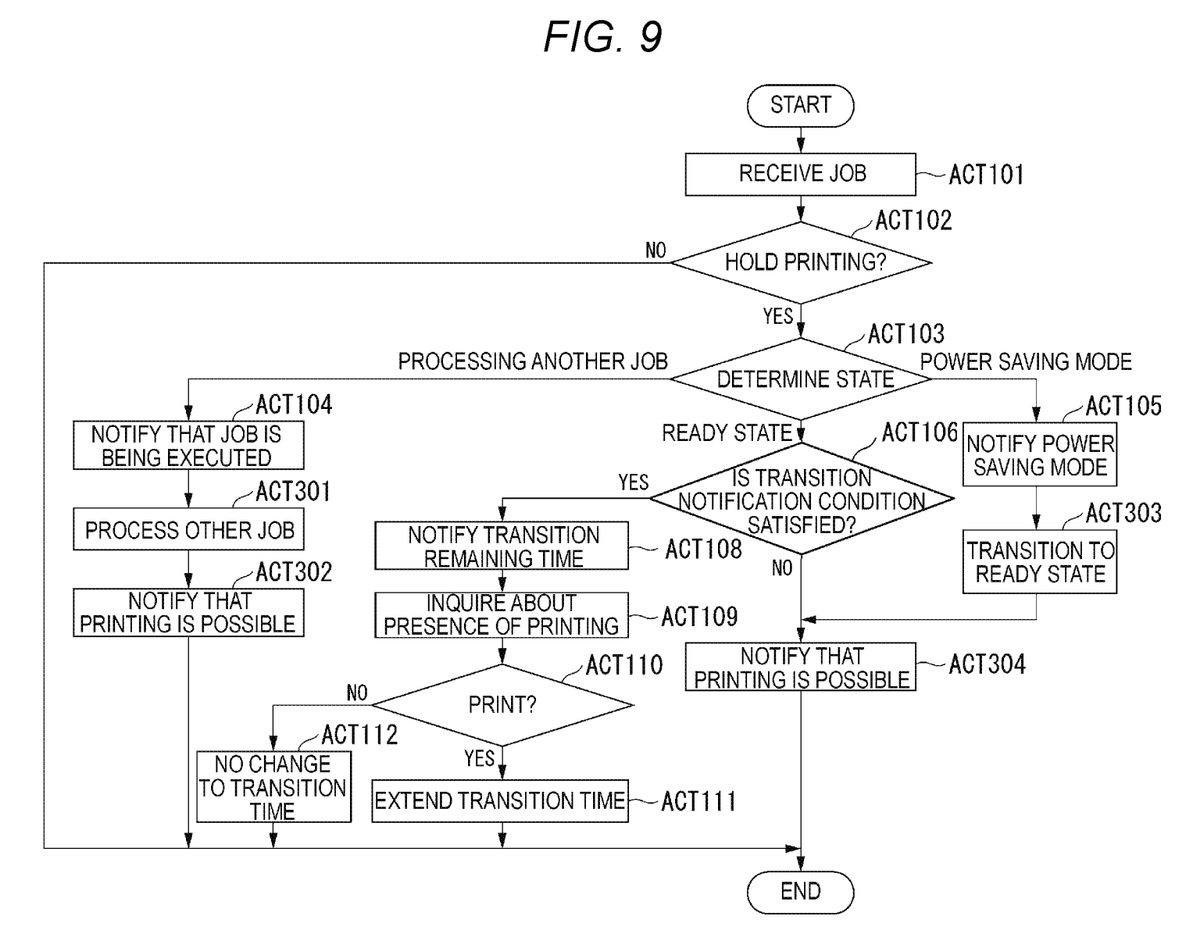
FIG. 9 is a flowchart showing a flow of notification processes performed by an image forming apparatus according to a third embodiment.

FIG. 9 is a flowchart showing a flow of notification processes performed by the image forming apparatus 2, according to the third embodiment. In FIG. 9, processes identical to those of FIG. 6 are denoted by same reference numerals and details thereof are omitted.

After the process of ACT104, the processor 300 processes the other job (ACT301). Then, the processor 300 generates the executability information indicating that the printing is executable. Next, the processor 300 specifies the client terminal 1 as the transmission source of the job by referring to the print job table. Then, the processor 300 controls the network interface 310 to transmit the generated executability information to the client terminal 1 as the transmission source of the job (ACT302). Then, the image forming apparatus 2 ends the process of FIG. 9.

After the process of ACT105, the processor 300 transitions the power saving mode to the ready state (ACT303). In detail, the processor 300 increases the temperature of the fixing unit included in the printer unit 130 by supplying power to the printer unit 130. Accordingly, the temperature of the fixing unit included in the printer unit 130 is changed from the power saving temperature to the fixing temperature. As a result, the image forming apparatus 2 is ready for printing.

Then, the processor 300 generates the executability information indicating that printing is executable. Next, the processor 300 specifies the client terminal 1 as the transmission source of the job by referring to the print job table. Then, the processor 300 controls the network interface 310 to transmit the generated executability information to the client terminal 1 as the transmission source of the job (ACT304). Then, the image forming apparatus 2 ends the process of FIG. 9.

The image forming apparatus 2 according to the third embodiment transmits the executability information to the client terminal 1 at all timing. Accordingly, the client terminal 1 displays the executability information transmitted from the image forming apparatus 2 on the screen at all timing. Thus, the user is able to immediately determine whether the printing is executable. Consequently, the user is able to execute the printing on the image forming apparatus 2 at the timing when the printing is executable. Since the user approaches the image forming apparatus 2 at the timing when the printing is executable, a time until printing is shortened even when the user instructs the printing after arriving at the image forming apparatus 2. Since the printing is performed after the user arrives at the image forming apparatus 2, security is maintained. Thus, it is possible to maintain the security while reducing the standby time of the user.

Hereinafter, modifications applicable to the first to third embodiments will be described.

The processor 300 may determine whether the printing is executable based on temperature information obtainable from a temperature sensor (not shown). In detail, the processor 300 determines that the printing is executable when a value indicated by the temperature information obtainable from the temperature sensor is equal to or greater than a temperature threshold value. Meanwhile, when the value indicated by the temperature information obtainable from the temperature sensor is smaller than the temperature threshold value, the processor 300 determines that the printing is not executable. For example, the processor 300 may perform determination based on the temperature information after it is determined that the printing is executable in each embodiment above. Then, the processor 300 generates the executability information indicating that the printing is executable when it is determined that the printing is executable by the determination based on the temperature information.

According to such a configuration, the user's waiting time may be further reduced. In detail, even when the printing is executable, if the temperature of the fixing unit has not reached the fixing temperature, the printing is unable to be executed until the fixing temperature is reached. Thus, when it takes time to reach the fixing temperature, the user needs to wait. According to this configuration, when the user sees the notification, the printing is immediately possible. Thus, the user's waiting time may be further reduced.

The processor 300 may be configured to switch the mode of the image forming apparatus 2 to the ready state according to an instruction from the client terminal 1 when the mode of the image forming apparatus 2 is in the power saving mode. As such, upon receiving the hold printing instruction from the client terminal 1, the image forming apparatus 2 in the power saving mode sends an inquiry about whether to cancel the power saving mode, to the client terminal 1. In detail, the image forming apparatus 2 inquires the client terminal 1 about whether to cancel the power saving mode. In this regard, the display 103 of the client terminal 1 displays a screen of selecting whether to cancel the power saving mode on the screen. When the user selects whether to cancel the power saving mode, the client terminal 1 transmits a response to the image forming apparatus 2. The processor 300 of the image forming apparatus 2 switches the mode of the image forming apparatus 2 to the ready state when the response obtained from the client terminal 1 indicates that the power saving mode is canceled. On the other hand, when the response indicates that the power saving mode is not cancelled, the processor 300 of the image forming apparatus 2 maintains the mode of the image forming apparatus 2, i.e., the power saving mode.

According to the image forming apparatus 2 of at least one embodiment described above, the printer unit 130 and the processor 300 are provided. The printer unit 130 forms an image on a fed sheet and fixes the image on the sheet by heating the sheet where the image is formed. When a print job received from the client terminal 1 is a hold print job, the processor 300 transmits executability information according to an operation state of the image forming apparatus 2 to the client terminal 1. Accordingly, it is possible to reduce a user's waiting time while maintaining security by the hold printing.

Some functions of the image forming apparatus 2 in the above-described embodiment may be performed by a computer. In this case, a program for achieving the function is recorded on a computer-readable recording medium. Then, a computer system reads the recording medium and executes the program. Here, the "computer system" includes an operating system, a peripheral device, or the like. Also, the "computer-readable recording medium" denotes a portable medium, a storage device, or the like. The portable medium is a flexible disk, a magneto-optical disk, ROM, CD-ROM, or the like. Further, the storage device is a hard disk or the like built in the computer system. Further, the "computer-readable recording medium" may be a storage that dynamically can store and maintain the program for a short period of time, like a network storage connected to a network in which the program is transmitted, e.g., the Internet or a telephone line. The "computer-readable recording medium" may be volatile memory in the computer system serving as a server or a client. The volatile memory stores and maintains a program for a fixed period of time. Further, the program may be for realizing a part of the functions described above. Further, the program may realize the above-described functions in combination with a program already recorded on the computer system.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. An image forming apparatus comprising:
   a network interface; and
   a processor configured to
      upon receipt of a print job from an external apparatus via the network interface, determine whether hold printing is instructed for executing the print job,
      when the hold printing is instructed, determine a state of the image forming apparatus,
      generate information about execution of the print job according to the determined state, and
      control the network interface to transmit the generated information to the external apparatus,
   wherein the state of the image forming apparatus is one of:
      a first state where the image forming apparatus is processing another print job,
      a second state where the image forming apparatus is in a power saving mode, and
      a third state where the print job is ready for execution, and
   wherein, when the determined state of the image forming apparatus is the third state and a remaining time to transition to a power saving mode is less than a predetermined time, the processor generates the information indicating that printing is executable and the image forming apparatus will enter the power saving mode in the remaining time.

2. The apparatus according to claim 1, wherein
   in the first state, the processor generates the information indicating that another job is being processed,
   in the second state, the processor generates the information indicating that the image forming apparatus is in a power saving mode, and
   in the third state, the processor generates the information indicating that printing is executable.

3. The apparatus according to claim 1, wherein
   when the determined state of the image forming apparatus is not the third state, the processor generates the information indicating that printing is executable after the state becomes the third state.

4. The apparatus according to claim 1, wherein
   after transmitting the generated information, the processor controls the network interface to further transmit to the external apparatus a confirmation notification for confirming whether to execute printing immediately.

5. The apparatus according to claim 4, wherein
   after transmitting the confirmation notification, upon receipt of a response instructing to execute printing immediately, the processor extends the remaining time.

6. The apparatus according to claim 1, wherein
   the processor is configured to
      when the determined state of the image forming apparatus is the second state, change the state to exit the power saving mode,
      after exiting the power saving mode, generate the information indicating that printing is executable, and
      transmit the generated information to the external apparatus.

7. The apparatus according to claim 1, wherein
   when the determined state of the image forming apparatus is the second state, the processor changes the state to exit the power saving mode according to an instruction from the external apparatus.

8. The apparatus according to claim 1, wherein the generated information includes a message to be displayed by the external apparatus.

9. A printing system comprising:
a client terminal; and
an image forming apparatus configured to communicate with the client terminal, wherein
the image forming apparatus comprises
a network interface; and
a processor configured to
upon receipt of a print job from an external apparatus via the network interface, determine whether hold printing is instructed for executing the print job,
when the hold printing is instructed, determine a state of the image forming apparatus,
generate information about execution of the print job according to the determined state,
control the network interface to transmit the generated information to the external apparatus, and
upon receipt of the transmitted information, the client terminal displays the information on a display,
wherein the state of the image forming apparatus is one of:
a first state where the image forming apparatus is processing another print job,
a second state where the image forming apparatus is in a power saving mode, and
a third state where the print job is ready for execution, and
wherein, when the determined state of the image forming apparatus is the third state and a remaining time to transition to a power saving mode is less than a predetermined time, the processor generates the information indicating that printing is executable and the image forming apparatus will enter the power saving mode in the remaining time.

10. The system according to claim 9, wherein
in the first state, the processor generates the information indicating that another job is being processed,
in the second state, the processor generates the information indicating that the image forming apparatus is in a power saving mode, and
in the third state, the processor generates the information indicating that printing is executable.

11. The system according to claim 9, wherein
when the determined state of the image forming apparatus is not the third state, the processor generates the information indicating that printing is executable after the state becomes the third state.

12. The system according to claim 9, wherein
after transmitting the generated information, the processor controls the network interface to further transmit to the external apparatus a confirmation notification for confirming whether to execute printing immediately.

13. The system according to claim 12, wherein
after transmitting the confirmation notification, upon receipt of a response instructing to execute printing immediately, the processor extends the remaining time.

14. The system according to claim 9, wherein
the processor is configured to
when the determined state of the image forming apparatus is the second state, change the state to exit the power saving mode,
after exiting the power saving mode, generate the information indicating that printing is executable, and
transmit the generated information to the external apparatus.

15. The system according to claim 9, wherein
when the determined state of the image forming apparatus is the second state, the processor changes the state to exit the power saving mode according to an instruction from the external apparatus.

* * * * *